United States Patent [19]

Dawe

[11] Patent Number: 4,907,333

[45] Date of Patent: Mar. 13, 1990

[54] DEVICE FOR ACCURATELY POSITIONING AND ALIGNING A GUIDE SLEEVE INTO A BORE OF A CYLINDER HEAD

[76] Inventor: Peter H. Dawe, 215 Springbrook, Sparta, N.J. 07871

[21] Appl. No.: 235,687

[22] Filed: Aug. 23, 1988

[51] Int. Cl.⁴ .................... B23P 19/04

[52] U.S. Cl. .................... 29/251; 29/263; 123/188 AA

[58] Field of Search .......... 29/251, 258, 263, 156.7 R, 29/156.7 A, 156.7 B, 156.7 C; 123/188 AA

[56] References Cited

U.S. PATENT DOCUMENTS

| | | | |
|---|---|---|---|
| 1,468,777 | 9/1923 | Edwards | 29/263 |
| 3,050,840 | 8/1962 | Dunkerley | 29/263 |
| 3,132,237 | 5/1964 | Pribonic | 29/156.7 R X |

*Primary Examiner*—Mark Rosenbaum
*Assistant Examiner*—Frances Chin
*Attorney, Agent, or Firm*—Burgess, Ryan & Wayne

[57] ABSTRACT

A device for accurately positioning and automatically aligning correctly each guide sleeve within a bore of a cylinder head includes a hemispherical base section having a flat lower surface which is positioned on the bed of a press, and an upper hemispherical surface which accurately aligns a valve seat thereon during forcible insertion of the guide sleeve into the bore, and a guide rod secured centrally to the upper hemispherical surface for insertion in the respective bore to accurately guide the guide sleeve which is force fit into the respective bore. The method according to the present invention includes the steps of heating the cylinder head, positioning the base section on the bed of the press; placing the heated cylinder head over the device so that a valve seat thereof is seated on the upper hemispherical surface and the guide rod is inserted through the respective bore corresponding to the valve seat; positioning the guide sleeve over the guide rod that protrudes above the cylinder head; forcing the guide sleeve into the respective bore with a friction fit and over the guide rod; wherein the force applied to the guide sleeve is transmitted to the cylinder head so that the valve seat is automatically aligned correctly on the arcuate surface and the guide sleeve will then be accurately inserted in the respective bore.

3 Claims, 2 Drawing Sheets

DEVICE FOR ACCURATELY POSITIONING AND ALIGNING A GUIDE SLEEVE INTO A BORE OF A CYLINDER HEAD

BACKGROUND OF THE INVENTION

The present invention relates generally to automotive engines and, more particularly, is directed to a method and device for accurately positioning and aligning a guide sleeve into a bore of a cylinder head.

In conventional automotive engines, the intake and exhaust of gases into the respective cylinder chambers are controlled by valves. Specifically, each valve includes a valve head and a valve stem, with the valve stem slidable within a bore in the cylinder head and the valve head engagable with a valve seat at the entrance of the bore for opening and closing the intake and exhaust ports for the cylinder chamber. In such a case, a guide sleeve is conventionally inserted with a friction fit, into each bore so as to guide movement of the valve stem therein.

Conventionally, in order to insert a guide sleeve into a bore, the cylinder head is heated in an oven or by a torch and simultaneously, the guide sleeve is immersed into a solution of alcohol and dry ice to cool and thereby shrink the sleeve. The cooled guide sleeve is then forcibly inserted into the bore of the heated cylinder head by a press, a hammer, or other conventional means.

However, using such a method, it is impossible to accurately control alignment of the guide sleeve within the cylinder head. Thus, the guide sleeve is often not correctly aligned in the bore. Specifically, the axis of the guide sleeve will often be offset and/or inclined with respect to the axis of the bore in the cylinder head. The valve stem which slides within the guide sleeve will also be out of alignment with the bore in the cylinder head. This poor alignment of the valves will translate into deviations of 0.020 inch to 0.080 inch at the edge of a two inch diameter valve.

Because of such misalignment, the valve head will not accurately seat on the valve seat so that the suction and discharge ports for the cylinder chamber will not be completely closed at the respective times. It is therefore necessary to remove material from the valve seat in order to accurately position the valve head thereon. This removal operation is not only time consuming but also requires use of expensive equipment. For example, a carbide cutter with a pilot positioned by a new guide sleeve is used to remove the bulk of material. The next step requires the use of a rotary grinder to remove chatter marks caused by the carbide cutters. In the final step, the valve seat is lapped to achieve a perfect fit.

As a result of such time consuming operations, the time required to install, for example, 12 new valve guide sleeves according to the prior art, is approximately 3 to 4 hours, depending upon the degree of misalignment of each of the guide sleeves.

OBJECTS AND SUMMARY OF THE INVENTION

Accordingly, it is an object of the present invention to provide a method and device for accurately positioning and automatically aligning correctly a guide sleeve within a bore of a cylinder head that overcomes the aforementioned problems characterizing the prior art.

It is another object of the present invention to provide a method and device for accurately positioning and aligning a guide sleeve within a bore of a cylinder head with a minimum of time.

It is still another object of the present invention to provide a method and device for accurately positioning and aligning a guide sleeve within a bore of a cylinder head and that any subsequent removal of material from the valve seat is kept to a minimum.

It is yet another object of the present invention to provide a method and device for accurately positioning and aligning a guide sleeve within a bore of cylinder head in which the valve stem is accurately guided by the guide sleeve so that the valve head accurately seats on the valve seat.

In accordance with an aspect of the present invention, for use with a cylinder head having a plurality of bores, a guide sleeve received tightly in each bore, a valve having a valve head and a valve stem insertable in each guide sleeve and a valve seat for seating each valve head, there is provided a device for accurately positioning and aligning each guide sleeve within a respective bore which includes a base section having a positioning surface for positioning the device on a support surface, and an upper aligning surface having an arcuate section for accurately aligning a valve seat thereon during forcible insertion of a guide sleeve into the respective bore; and a guide rod secured to the upper aligning surface for insertion into the respective bore for accurately guiding the guide sleeve which is force fit into the respective bore.

In accordance with another aspect of the present invention, a method of inserting a guide sleeve into a bore of a cylinder head of the type having a valve seat associated with each bore and a valve having a valve head and a valve stem insertable through each guide sleeve, includes the steps of heating the cylinder head; positioning a positioning surface of a base section of a tool on a support surface; placing the heated cylinder head over the tools so that a valve seat thereof is seated on an arcuate section of an upper aligning surface of the base section of the tool and a guide rod secured to the upper aligning surface of the tool is inserted in a respective bore corresponding to the valve seat; positioning a guide sleeve over the guide rod that protrudes above the cylinder head; forcing the guide sleeve into the respective bore with a friction fit and over the guide rods; wherein the force applied to the guide sleeve is transmitted to the cylinder head so that the valve seat is automatically aligned correctly on the arcuate surface and the guide sleeve is accurately aligned in the respective bore.

The above and other objects, features and advantages of the present invention will become readily apparent from the following detailed description thereof which is to be read in connection with the accompanying drawings.

DETAILED DESCRIPTION OF A PREFERRED EMBODIMENT

Figure 1:
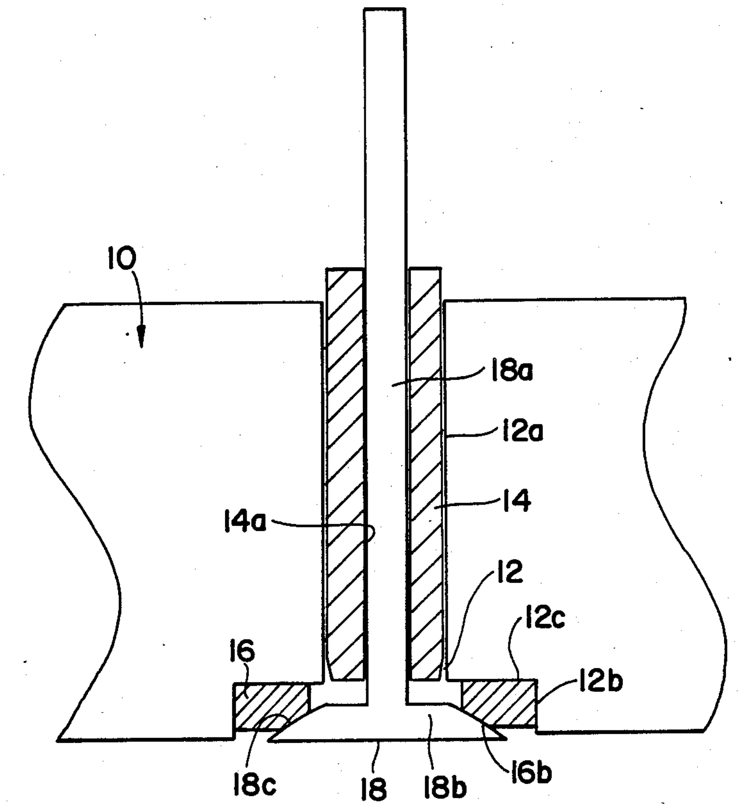
FIG. 1 is a cross-sectional view of a valve having a valve stem slidably inserted through a guide sleeve of a bore of a cylinder head and the valve head thereof seated on a valve seat.

Referring to the drawings in detail, and initially to FIG. 1, there is shown a cylinder head 10 having a bore 12 with a narrow section 12a having a first diameter and an upper entrance section 12b in communication with narrow section 12a and forming an annular shoulder 12c therebetween. A guide sleeve 14 is forcibly fit into narrow section 12a of bore 12 and includes a central bore 14a. An annular valve seat 16 is positioned on annular shoulder 12c within upper entrance section 12b and includes an inner beveled annular surface 16b.

A valve 18 includes a valve stem 18a that is slidably positioned in central bore 14a of guide sleeve 14 for reciprocable movement therein, and a valve head 18b is connected at the upper stem of valve stem 18a. Valve head 18b has a lower beveled surface 18c which corresponds to beveled annular surface 16b of valve seat 16 so that valve head 18b seats on valve seat 16 to completely close the respective suction or discharge port (not shown) for the respective cylinder chamber.

The present invention is directed to the accurate positioning and aligning of guide sleeve 14 within bore 12, without the necessity of removing large amounts of material from beveled annular surface 16b of valve seat 16 that is, to provide such accurate positioning and aligning of each guide sleeve 14 in bore 12 so that valve head 18b accurately seats on valve seat 16.

Figure 2:
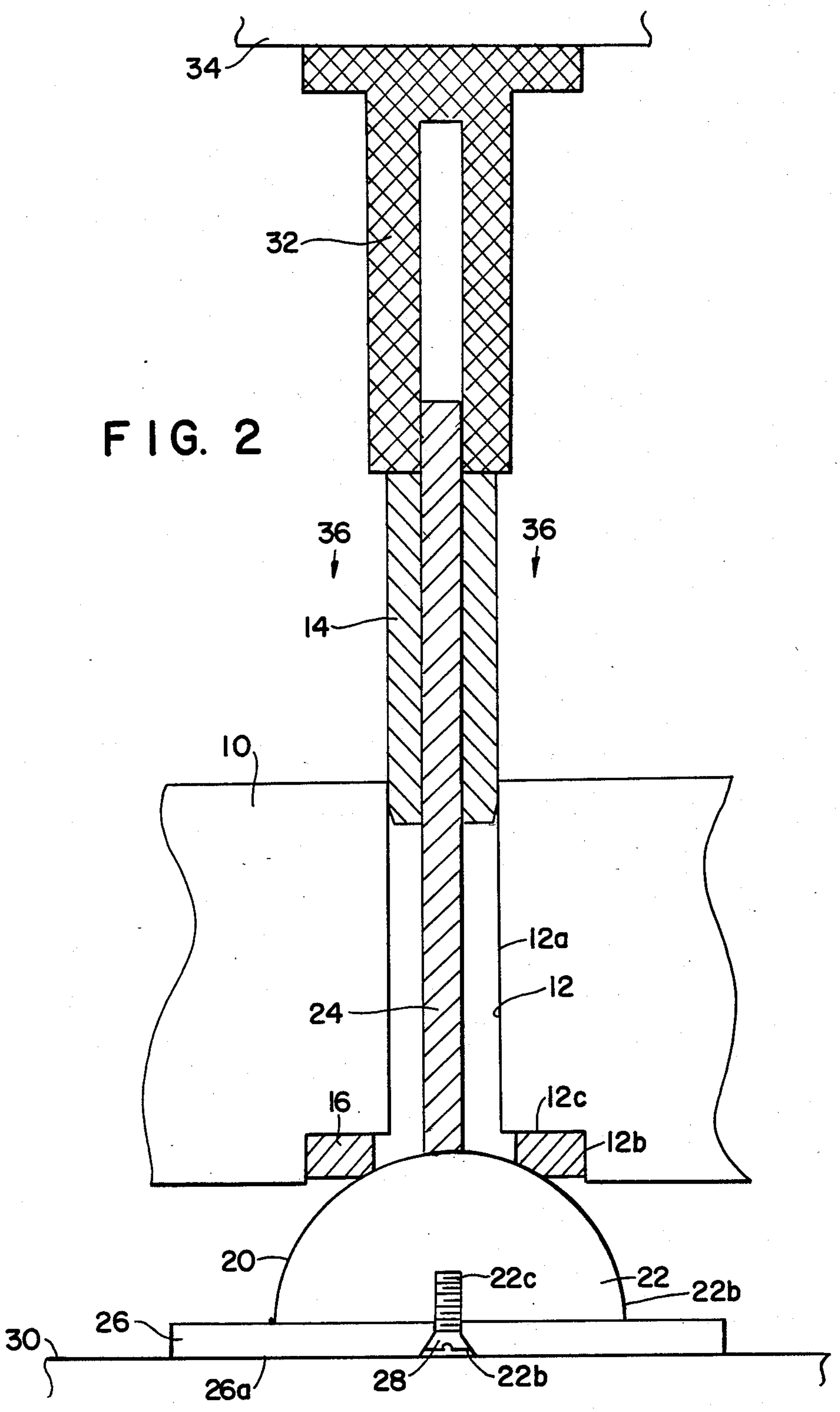
FIG. 2 is a cross-sectional view of a device and method for accurately positioning and aligning a guide sleeve within a bore of a cylinder head.

Specifically, with reference to FIG. 2, the present invention provides a tool 20 having a hemispherical base 22 and a guide rod 24 secured to hemispherical base 22. Specifically, hemispherical base 22 includes a flat lower surface attached to a base plate 26, with a positioning surface 26a which positions tool 20 on a support surface 30 such as that of a press. Furthermore, the base plate 26 is provided with a central opening 26b which receives a screw 28 attaching plate 26 to hemispherical base 22, via threaded central opening 22c. Hemispherical base 22 also includes an upper arcuate, hemispherical surface 22b which functions as an upper aligning surface for aligning a valve seat 16 thereon, as shown. In such a case, it will be appreciated that cylinder head 10, with a worn guide sleeve removed, is inverted and placed over tool 20 so that a valve seat 16 seats on hemispherical surface 22b with guide rod 24 inserted through bore 12. In such a case, guide rod 24 extends completely through bore 12 to a position above inverted cylinder head 10.

Thereafter, a new guide sleeve 14 is positioned over guide rod 24, a driver cylinder 32 is placed over guide sleeve 14, and the guide sleeve is then forcibly inserted through narrow section 12a of bore 12 in the direction of arrows 36 by a press 34 or the like. During such force fit of guide sleeve 14 in the direction of arrows 36, and because of the tight friction fit of guide sleeve 14 within narrow section 12a of bore 12, the force applied along arrows 36 is transmitted also to cylinder head 10 and thereby to valve seat 16. As a result, valve seat 16 will automatically align correctly on hemispherical surface 22b so as to accurately align guide rod 24 within bore 12. Accordingly, when guide sleeve 14 is completely inserted into narrow section 12a of bore 12, it is accurately positioned therein so that the axis thereof coincides with the axis of bore 12a. This means that a valve head 18b subsequently inserted through guide sleeve 14 will accurately seat on valve seat 16 without requiring any further machining of the valve seat.

Thus with the present invention, there is no longer any necessity to cool guide sleeve 14, although this is certainly available as an alternative. The cylinder head 10 is heated to approximately 250 degrees Fahrenheit using a hand torch, tool 20 is then placed on the support surface or bed 30 of a hydraulic arbor press and the heated cylinder head 10 is placed over tool 20, as shown in FIG. 2. A new sleeve 14 and drive cylinder 32 is placed over guide rod 24 of tool 20 that protrudes above cylinder head 10. While manually holding the assembly, a foot switch or the like is depressed to activate the press. The force required to press the guide sleeve 14 into position, as aforementioned, also holds valve seats 16 firmly against hemispherical surface 22b, thereby automatically maintaining accurate alignment. All sleeves are installed in sequence while the cylinder head 10 is still hot. A minimal grinding operation is performed to verify proper insertion followed by a final lapping operation to bring the valve into perfect registration with the existing valve seat 16.

The present invention provides the distinct advantage of controlled accuracy of each sleeve installation while eliminating the cutting so as to save time and eliminate the need to replace valve seats that have been cut away due to cutting and grinding operations required to compensate for poorly aligned valve sleeves. Further, only 0.002" to 0.008" of material need be removed from a valve seat to accomplish an accurate fit. Thus, the total installation time for 12 guides is approximately 20 minutes as compared with 3 to 4 hours with prior art methods and devices.

It will also be appreciated that the tool 20 according to the present invention may be adapted to install valve guides in a variety of four cycle internal combustion engines.

Having described this specific preferred embodiment of the invention with reference to the accompanying drawings, it will be appreciated that the present invention is not limited to that precise embodiment, and that various changes and modifications can be effected therein by one of ordinary skill in the art without departing from the spirit or scope of the invention as defined by the appended claim.

What is claimed is:

1. For use with a cylinder head having a plurality of bores, a guide sleeve received tightly in each bore , a valve having a valve head and a valve stem insertable through each guide sleeve, and a valve seat for seating each valve head, a device for accurately positioning and automatically aligning correctly each guide sleeve within a respective bore, comprising:
   (a) a base section having
      (i) a positioning surface for positioning said device on a support surface;
      (ii) an upper aligning surface having an arcuate section for accurately automatically aligning said valve seat thereon during forcible insertion of said guide sleeve into the respective bore; and
   (b) a guide rod secured to said upper aligning surface for insertion into said respective bore for automatically accurately guiding said guide sleeve which is force fit into the respective bore.

2. A device according to claim 1 wherein said base section has a hemispherical configuration with a lower flat surface and an upper hemispherical surface.

3. A device according to claim 2 wherein said guide rod is secured centrally to said hemispherical surface.

* * * * *